US007934207B2

(12) United States Patent
Gustafsson et al.

(10) Patent No.: US 7,934,207 B2
(45) Date of Patent: Apr. 26, 2011

(54) DATA SCHEMATA IN PROGRAMMING LANGUAGE CONTRACTS

(75) Inventors: Niklas Gustafsson, Bellevue, WA (US);
John L. Hamby, Seattle, WA (US);
Patrick J. Helland, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1162 days.

(21) Appl. No.: 11/613,046

(22) Filed: Dec. 19, 2006

(65) Prior Publication Data

US 2008/0147698 A1      Jun. 19, 2008

(51) Int. Cl.
*G06F 9/45*    (2006.01)
*G06F 9/44*    (2006.01)
*G06F 17/30*   (2006.01)

(52) U.S. Cl. ......... 717/143; 717/114; 717/137; 707/756

(58) Field of Classification Search ................... None
See application file for complete search history.

(56) References Cited

U.S. PATENT DOCUMENTS

| | | | |
|---|---|---|---|
| 5,966,531 A | 10/1999 | Skeen et al. | |
| 6,195,677 B1 | 2/2001 | Utsumi | |
| 6,665,701 B1 | 12/2003 | Combs et al. | |
| 6,940,870 B2 | 9/2005 | Hamlin | |
| 6,971,096 B1 | 11/2005 | Ankireddipally et al. | |
| 6,990,513 B2 | 1/2006 | Belfiore et al. | |
| 7,093,231 B2 * | 8/2006 | Nuss | 717/114 |
| 7,120,703 B2 | 10/2006 | Li et al. | |
| 7,694,284 B2 * | 4/2010 | Berg et al. | 717/137 |
| 7,739,223 B2 * | 6/2010 | Vaschillo et al. | 707/999.101 |
| 7,756,882 B2 * | 7/2010 | Aharoni et al. | 707/756 |
| 7,805,713 B2 * | 9/2010 | Patel | 717/143 |
| 2002/0100027 A1 * | 7/2002 | Binding et al. | 717/137 |
| 2003/0140308 A1 * | 7/2003 | Murthy et al. | 715/500 |
| 2004/0073913 A1 * | 4/2004 | Fairweather | 719/328 |
| 2004/0083465 A1 * | 4/2004 | Zhang et al. | 717/143 |
| 2004/0111698 A1 | 6/2004 | Soong et al. | |
| 2004/0205562 A1 * | 10/2004 | Rozek et al. | 715/513 |

OTHER PUBLICATIONS

"Automating XML documents transformations: a conceptual modelling based approach", Boukottaya et al., Jan. 2004, pp. 81-90, <http://delivery.acm.org/10.1145/980000/976307/p81-boukottaya.pdf>.*
"A comprehensive solution to the XML-to-relational mapping problem", Amer-Yahia et al., Nov. 2004, pp. 31-38, <http://delivery.acm.org/10.1145/1040000/1031461/p31-amer-yahia.pdf>.*
"Statistical schema matching across web query interfaces", He et al., Jun. 2003, pp. 217-228, <http://delivery.acm.org/10.1145/880000/872784/p217-he.pdf>.*
Adhikari, et al.; D-Stampede: Distributed Programming System for Ubiquitous Computing; Jul. 2002; 8 pages.
Commins, M.; JXTA, In support of the Migration of Users Across Smart Spaces; Sep. 2002; 100 pages.
Chiang, C.; High-Level Heterogeneous Distributed Parallel Programming; 2004, 6 pages.
Karimi, K. et al.,; Transparent Distributed Programming under Linux; May 14-17, 2006, 7 pages.

* cited by examiner

*Primary Examiner* — Thuy Dao
(74) *Attorney, Agent, or Firm* — Workman Nydegger (57) ABSTRACT

Systems and methods that integrate data type conversion(s) into a programming language, and describe external formats within a syntax thereof. A mapping component defines a declarative mapping from an external data format to one or more of its internal data types (e.g., expressing external data types in terms of source languages.) Moreover, a rule establishing component can define value-based rules, such as invariants to the external data format, wherein the schema declaration further defines data fields that make up the schema. Accordingly, by expressing rules in form of predicate logic (instead of imperative program logic) the subject innovation increase a likelihood that compilers can reason about the data.

17 Claims, 10 Drawing Sheets

DATA SCHEMATA IN PROGRAMMING LANGUAGE CONTRACTS

BACKGROUND

The advent of global communications networks supplies users with access to significant amount of data. In general, such free flow of information prevalent today in wired and wireless regimes demands that the source and destination be compatible insofar as storing and interpreting the data for use, for example. The world is populated with information sources where in many cases the data can be represented differently from source to source.

Accordingly, a major challenge facing companies and individuals today is that data existing in one model/schema may be needed in a different model/schema for another purpose. Conversion processes are being hampered by a largely disparate and ever-changing set of models/schemas. For example, in data warehousing where data is received from many different sources for storage and quick access from other sources, conversion processes can create difficulties. Converting data from one model to another model is not only time-consuming and resource intensive, but can be fraught with conversion problems.

Furthermore, conventional data systems, applications and operating systems have typically relied on multiple incompatible handling and exchange for data, including; the registry, event log messages, contact information, and e-mail—or simply have used multiple flat files for data such as images and audio. For example, in conventional data stores, stored contents are in general treated as separate entities, even though they are interrelated at some level. Accordingly, when a large number of items and applications exist, it can become important to have a flexible and efficient mechanism to exchange items between applications.

At the same time, given new file systems that operate based on relational objects with an extensible data type, new challenges can arise. For example, in such environments, a data model can play an important role in the way that participants interact with the database. Moreover, a manner for which applications exchange, store and retrieve data can be governed by the data model.

Interactions involved with data handling of such a data store can involve various parties and different data models. Accordingly, existence of different models can hinder proper interaction between the participants, as data may not be properly representable to all parties involved. Moreover, conventional methods of converting from one data representation to another can typically become time consuming and resource intensive, while at the same time be fraught with conversion problems, and in some cases, totally impracticable due to such complexity.

As programming approaches and foundations have evolved, application programming interfaces (APIs) and programming schemas have been developed to standardize and unify programming methodologies that were previously multi-variant and relatively incompatible. Modern programming therefore often involves employing APIs and schemas in conjunction with reusable libraries. Such Programming languages continue to evolve to facilitate specification by programmers as well as efficient execution.

Compilers and/or interpreters bear the burden of translating high-level logic into executable machine code. In general, compilers and/or interpreters are components that receive a program specified in a source programming language (e.g., C C#, Visual Basic, Java . . . ) and covert the logic provided thereby to machine language that is executable by a hardware device.

However, the conversion need not be done verbatim. In fact, conventional compilers and/or interpreters analyze the source code and generate very efficient code. For example, programmers write code that sets forth a logical flow of operations that is intuitive and easy for humans to understand, but is often inefficient for a computer to execute. Compilers and/or interpreters can identify inefficiencies and improve program performance at the hardware level by eliminating unnecessary operations and/or rearranging the execution of instructions while still achieving the intended results. In this manner, programmers can create robust and efficient software.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation provides for systems and methods that integrate data type(s) conversion into a programming language(s), and describe external formats within a syntax of the programming language(s)—via a mapping component that defines a declarative mapping from an external data format to one or more of its internal data types (e.g., expressing external data types in terms of source languages.) Moreover, a rule establishing component can define value-based rules, such as invariants to the external data format, wherein the schema declaration further defines data fields that make up the schema, (e.g., names, types, acceptable values such fields.) Such rule establishing component can further provide for enforceable semantic rules about exchanged data, and a form of automated argument validation. For example, the invariants language can be defined as a functional subset of the source language that allows the programmer to express the rules using predicate logic, defining predicates and clauses over the data elements of the schema and the related schemata it refers to. Accordingly, by expressing rules in form of predicate logic (instead of imperative program logic), the subject innovation increase a likelihood that compilers can efficiently reason about the data and its invariants.

In a related aspect, the subject innovation integrates the conversion into the programming language external formats and mappings, by describing external data formats inside a programming language that conventionally has been employed for describing internal formats. The mapping can occur by constraining expressions both in the external formats and the idioms of the internal language that are used to describing it, to arrive at a subset of the two. Such subset enables sharing between languages of different object oriented type systems, and allows mapping to be straight forward and readily preformed. For example, by employing terms that are internal to the program, the external expressions can be expressed and mapped automatically. Accordingly, preserving versionability of the exchange format can be readily provided.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
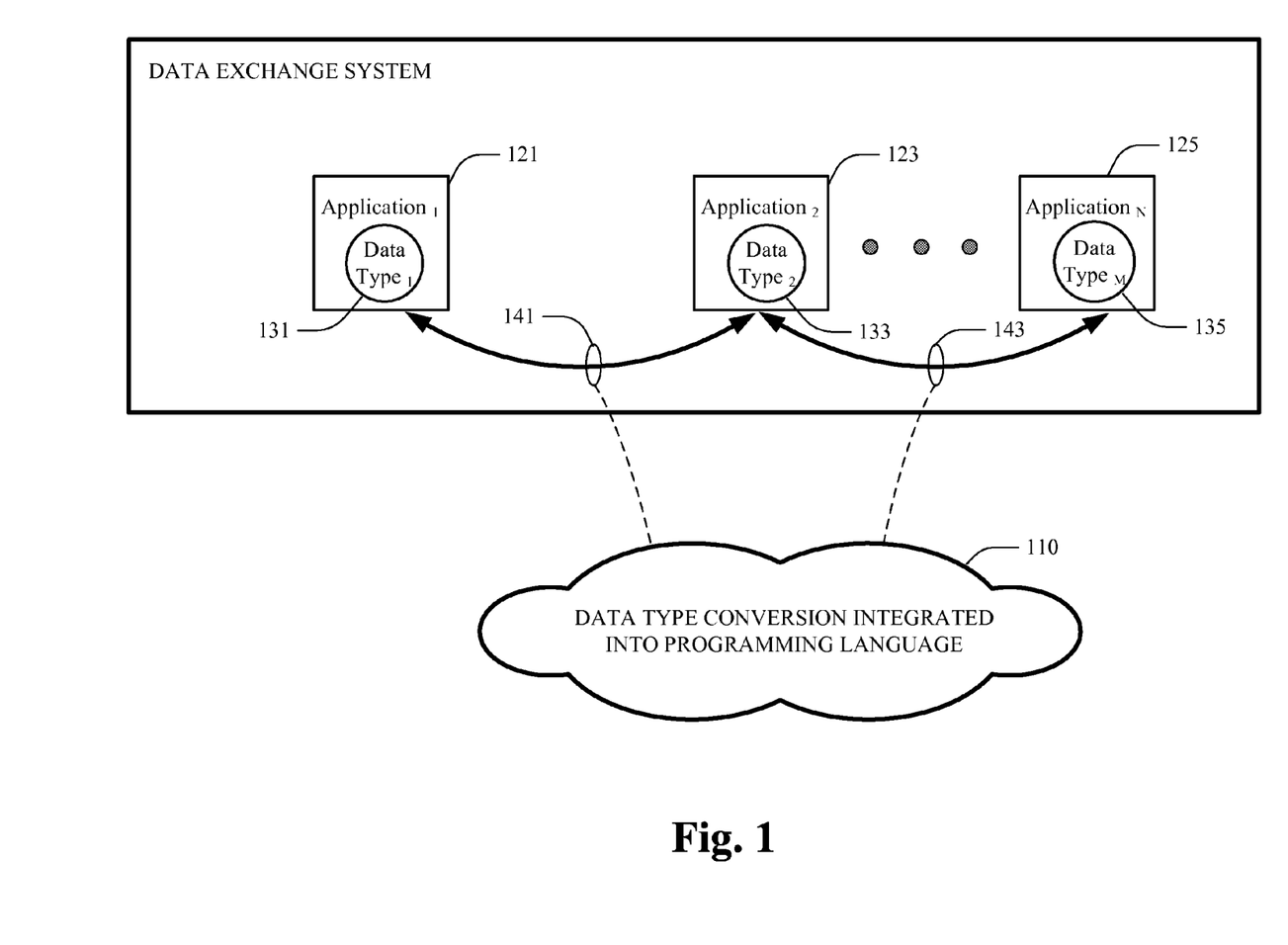
FIG. 1 illustrates an exemplary system that integrates data type conversion into a programming language, in accordance with an aspect of the subject innovation.

FIG. 1 illustrates a data exchange system 100 that integrates data type conversion into a programming language, and describe external formats within a syntax thereof, to facilitate data transfer between applications 121, 123, 125 (1 thru N, N being an integer). Data for each of the applications 121, 123, 125 can be defined through a set of schema that participate in a data model associated with that respective application, wherein each schema can define a set of types that collectively form a type hierarchy across a schema set. For example, a "type" can describe information about data, to constrain, classify or set out rules with respect to such data. Alternatively, the type system can be said to define allowable values, such as a variable or expression of type integer is confined to being a positive or negative whole number including zero. A type can come in many forms and can include a formal type system, metadata, data models, schemas, contracts, and the like.

Moreover, the data model can be extensible through the introduction of new schema, which extends at least one existing schema, for example. Accordingly, the applications 121, 123, 125 can include different data types and models 131, 133 and 135 (1 thru M, M being an integer) such as object oriented, entity relationships, XMl, SQL, and the like. Thus, versioning scenarios can emerge during the data exchange 141, 143 wherein different sets and versions of schema can be referenced, and inconsistencies can occur if the subset exercised during a data exchange 141, 143 fail to match. A mismatch can either be due to a disparity in the version of a definition, and/or due to a missing definition. Such mismatch can occur when a version of a type is available to at least of one of the applications 121, 123, 125 and is different from that of the other applications, or when a type is available to at least one party but not all. As described in detail infra, at 110 data type conversion can be integrated into a programming language employed by the applications 121, 123, 125, to describe external formats within syntax thereof, and hence facilitate data exchange between the applications 121, 123 and 125.

Figure 2:
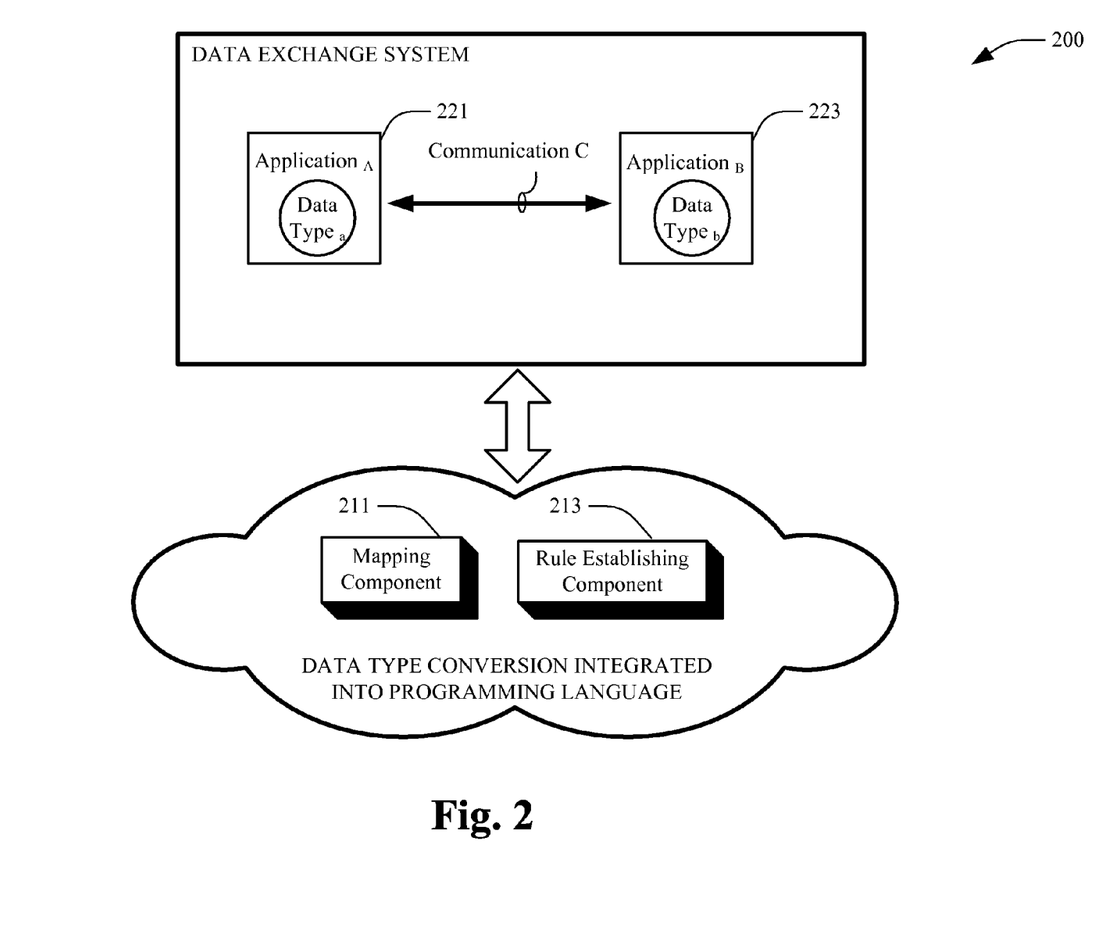
FIG. 2 illustrates an exemplary data exchange system that employs a mapping component and a rule establishing component, to facilitate integrating data type conversion into a programming language.

FIG. 2 illustrates an exemplary system 200 that integrates data type conversion into a programming language in accordance with an aspect of the subject innovation. The system 200 includes a mapping component 211 that defines a declarative mapping from an external data format to one or more of its internal data types (e.g. expressing external data types in terms of source languages), wherein automating transformation can be provided on a sending side and a receiving side of data exchange. For example, applications A (221) and B (223) exchange data via a communication course C. Application A can have data expressed as an instance of object oriented class with data instance Da. Communication course C accepts data formats as an external representation S, and can be accessed via a programmatic interface that defines such schema by Application A. Hence, Da is required to be converted to S by application A, and such conversion is integrated into the programming language external formats and mappings, by describing external data formats inside programming language that conventionally has been employed for describing internal formats.

Moreover, a rule establishing component 213 can define value-based rules, such as invariants to the external data format, wherein the schema declaration further defines data fields that make up the schema, (e.g., names, types, acceptable values such fields.) Such rule establishing component can further provide for enforceable semantic rules about exchanged data, and a form of automated argument validation. For example, the invariants language can be defined as a functional subset of the source language that allows the programmer to express the rules using predicate logic, defining predicates and clauses over the data elements of the schema and the schemata it refers to. Accordingly, by expressing rules in form of predicate logic (instead of imperative program logic) the subject innovation increase a likelihood that compilers can reason about the data.

Figure 3:
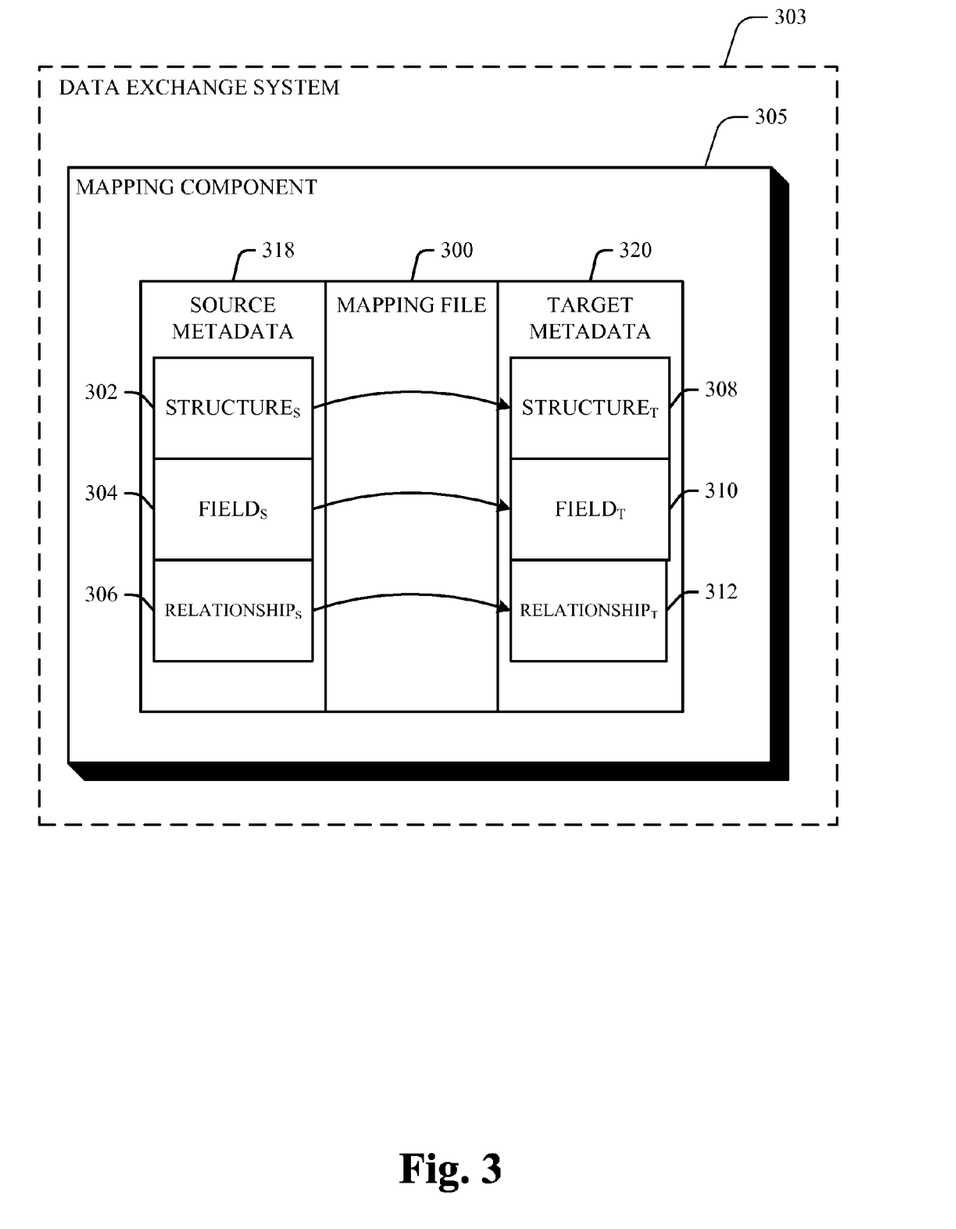
FIG. 3 illustrates a particular mapping component as part of a data exchange system in accordance with an aspect of the subject innovation.

FIG. 3 illustrates a particular mapping component 305 as part of a data exchange system 303 in accordance with an aspect of the subject innovation. The mapping component 305 can include a mapping file 300 that aligns mapping function(s) between a source metadata 318 and a target metadata 320. For example, the source metadata 318 and target metadata 320 can each comprise three entities that may be used to establish a mapping relationship, namely: structure, field, and relationship. Thus, the source metadata 318 includes a STRUCTURE$_S$ entity 302, a FIELD$_S$ entity 304, and a RELATIONSHIP$_S$ entity 306. Similarly, the target metadata

110 includes a corresponding STRUCTURE$_T$ entity 308, a FIELD$_T$ entity 310, and a RELATIONSHIP$_T$ entity 312. It is to be appreciated that such an arrangement is exemplary in nature and other layouts are well within the realm of the subject innovation.

In this particular example, the structure 302, 308 can function as a base component of the data model schema, and serves as a container for related mapping fields (e.g., a class in an object domain, a relational domain and the like.) Likewise, field entity 304, 310 can associate with a data model concept that holds typed data (e.g., properties in an object domain.) Moreover, the relationship can act as the link and association between two structures, and can describe how structures in the same domain relate to each other. The relationship can be established through either common fields in the two structures, and/or containment/reference wherein a structure contains another structure, e.g., containment hierarchy, and an object that references another object through its field, for example. Hence, the mapping can occur by constraining expressions both in the external formats and the idioms of the internal language that are used to describing it, to arrive at a subset of the two. Such subset enables sharing between language(s) of different object oriented type systems, and allows mapping to be straight forward and readily preformed—wherein, by employing terms that are internal to the program, the external expressions can be expressed and mapped automatically.

For example, typically Visual Basic (VB) has been a data-centric language, wherein outside data (data sent between services) is supported via programmatic manipulation of XML, and inside data (data that is managed and manipulated within a service) can be supported via language-integrated queries. Moreover, for a related schema, VB schema can function as VB support for data contracts, wherein such data contracts can represent an entire category of data. In one aspect, by not tying the data contract definition directly to the type that is serialized/de-serialized, the subject innovation allows a type to adhere to more than one data contract. As detailed infra, the subject innovation is described with respect to VB examples, and it is to be appreciated that the innovation is not so limited.

A schema can be considered similar to a class or interface definition with only properties. As with an interface, typically the abstract members of a schema are declared without an access specifier. Moreover, Schema properties cannot be declared as ReadOnly or WriteOnly, and in general, abstract members of a schema are defined as either 'Required' or 'Optional'. Such schema can also function as the location of choice regarding validation logic for data passed between components. Data validation can be commonly implemented in a variety of ways and in a variety of places, depending on associated purpose. For outside data, ad hoc validation can occur when such data passes the "trust boundary" of a component (sent to/received from another component). By not tying the data contract definition directly to the type that is serialized/de-serialized, the subject innovation enables a type to adhere to more than one data contract.

The set of abstract members is what defines a schema's structure, and such structure is defined only in terms of properties, e.g.

```
Schema IA
    Required Name As String
    Optional Address As String
End Schema
```

The set of abstract members is what defines a schema's structure, and such structure is defined only in terms In addition to properties, a schema can define a set of rules over all classes implementing it. Rules can be expressed as Boolean conditions that must all hold true at certain points during the lifetime of a schema instance, as described in detail infra, for example;

```
Schema IA
    Required Name As String
    Optional Address As String
    Rules
        Require Not String.IsNullOrEmpty(Name)
    End Rules
End Schema
```

The rule establishing component can define rules in terms of: properties of the schema, such as properties of schemas that are employed as the types of properties in the invariant-defining schema, compile-time constants, functions, and the like. Such can be placed inside blocks that in general contain only expressions of rules, and for each schema, there can exist more than one block. In addition, typically a rules block can only contain three kinds of statements, namely; 'Require,' which is a new statement added to VB, Try . . . Catch statements, and 'Dim' statements. In general, Rules may not modify anything—including locals declared using 'Dim,' and therefore assignment statements are typically not allowed. Similarly, Functions can be employed to define sub-expressions of invariant definitions—and unlike other schema members, they may be declared as 'public,' 'private,' or 'protected.' For example;

```
Public Schema IA
    Required Name As String
    Optional Address As String
    Private Function MustHaveName( ) As Boolean
        Return Not String.IsNullOrEmpty(Name)
    End Function
    Rules
        Require MustHaveName
    End Rules
End Schema
```

The same stringent functional requirements can apply as for invariant blocks, wherein functions can typically only contain three kinds of statements: 'Return,' Try . . . Catch statements, and 'Dim' statements. In general, functions may not modify anything—including locals declared using 'Dim,' hence assignment statements are not allowed. The same expression terms are allowed within functions as within invariant blocks: schema properties, compile-time constants, and schema functions. Functions can be called from anywhere, according to their protection level.

In addition to schema properties, rules, and functions, a schema definition may contain constant and enum declarations: e.g.;

```
Schema IA
    Required Name As Names
```

```
    Optional Address As String
    Private Const NotApplicable As String = "N/A"
    Public Enum Names
        Adam
        Bert
        Charles
        David
        Erik
        Frank
    End Enum
End Schema
```

In addition to schema properties, rules, and functions, a schema definition can contain constant and enum declarations:

```
Schema IA
    Required Name As Names
    Optional Address As String
    Private Const NotApplicable As String = "N/A"
    Public Enum Names
        Adam
        Bert
        Charles
        David
        Erik
        Frank
    End Enum
End Schema
```

In general, by implementing a schema, an instance does not typically establish any kind of is-a relation to it; and any reference to a schema is unrelated to any other .NET type (except 'Object').
For example:

```
Dim obj As New Foobar
Dim x As IA = obj
Dim isAIA As Boolean = TypeOf obj Is IA      '
Will be False
Dim isAFobar As Boolean = TypeOf x Is Foobar '
Will be False
```

Accordingly reference identity is not maintained:
Dim xobjEq As Boolean=obj Is IA 'Will be False A schema can inherit from another schema, but typically not from a class other than 'System.Object.' In addition, typically classes or interfaces may not inherit a schema. Moreover, for schema, polymorphic inheritance semantics are typically not applicable.

Furthermore, Rules can be enforced when wrapping an instance, array, or collection of instances into a schema, array of schema, or collection of schema (coercion). Such rules can also be enforced when an instance is passed to a method which accepts a schema as an argument. At any time, a schema's rules may be enforced on a schema instance by calling 'Check(obj),' defined in the VB runtime:

```
Dim a As PersonInfo = . . .
    . . .
Check(a)
```

Likewise, regarding mapping restrictions—a schema member defined in terms of schema can be mapped (implicitly or explicitly) to any member of a type that implements such schema. A schema member defined in terms of a non-schema type can in general be mapped only to members that conform using normal Common Language Runtime (CLR) widening conversion rules.

For example, a schema member of type String can in general only be mapped to members of type String. A schema member of type Byte can be mapped to Byte, Short, Integer, or Long. A schema member of type C can be mapped to members that have type C or any type derived from it. In essence, when coercing from the class instance to the schema instance, the member conversion typically should be widening, and not narrowing.

For inheritance, a schema inheriting another schema can be managed as follows. For example, given:

```
Schema IBase
End Schema
Schema IDerived
    Inherits IBase
End Schema
``` the VB compiler produces:

```
<DataContract(Name:="IBase")>
Public Class IBase
    Inherits Microsoft.VisualBasic.SchemaImplementationBase
    Implements SchemaInterface, Microsoft.VisualBasic.IHasRules
    Implements IUnknownSerializationData
        Protected Interface SchemaInterface
        End Interface
End Class
<Microsoft.VisualBasic.CompilerServices.Schema( )>
<DataContract(Name:="IDerived")>
Public Class IDerived
    Inherits IBase
    Implements SchemaInterface
    Protected Interface SchemaInterface
        Implements IBase.SchemaInterface
    End Interface
End Class
```

Figure 4:
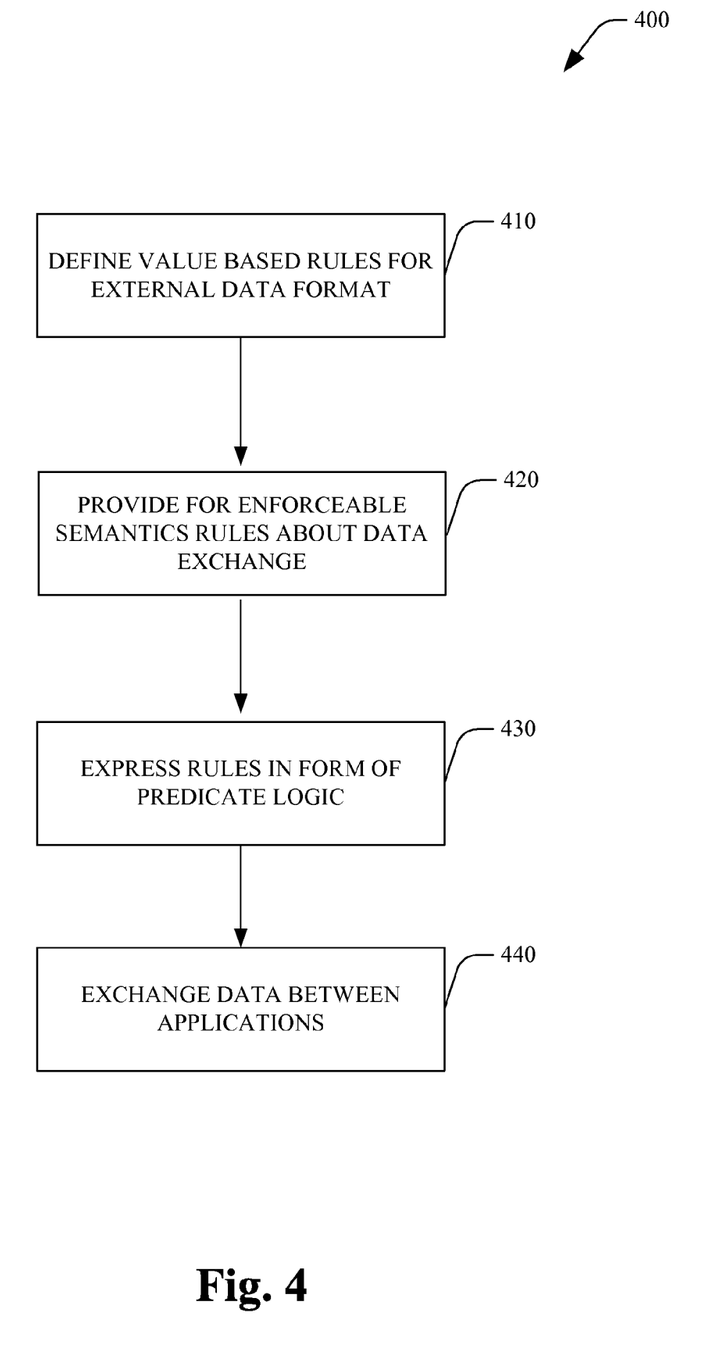
FIG. 4 illustrates a methodology of data exchange between applications, in accordance with an aspect of the subject innovation.

FIG. 4 illustrates a related methodology 400 of data exchange between applications in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially, and at 410 value-based rules can be defined, such as invariants to the external data format, wherein the schema declaration further defines data fields that make up the schema, (e.g., names, types, acceptable values such fields.) Next, and at 420 enforceable semantic rules can be supplied about exchanged data (e.g., a form of automated argument validation.) For example, the invariants language can be defined as a subset of the source language, a functional subset that allows the programmer to express the rules using predicate logic, defining predicates and clauses over the data elements of the schema and the schemata it refers to. Subsequently and at 430 by expressing rules in form of predicate logic (instead of imperative program logic) a likelihood that compilers can reason about the data can be increased. Next and at 440 data can be exchanged between applications that do not share a same data type.

Figure 5:
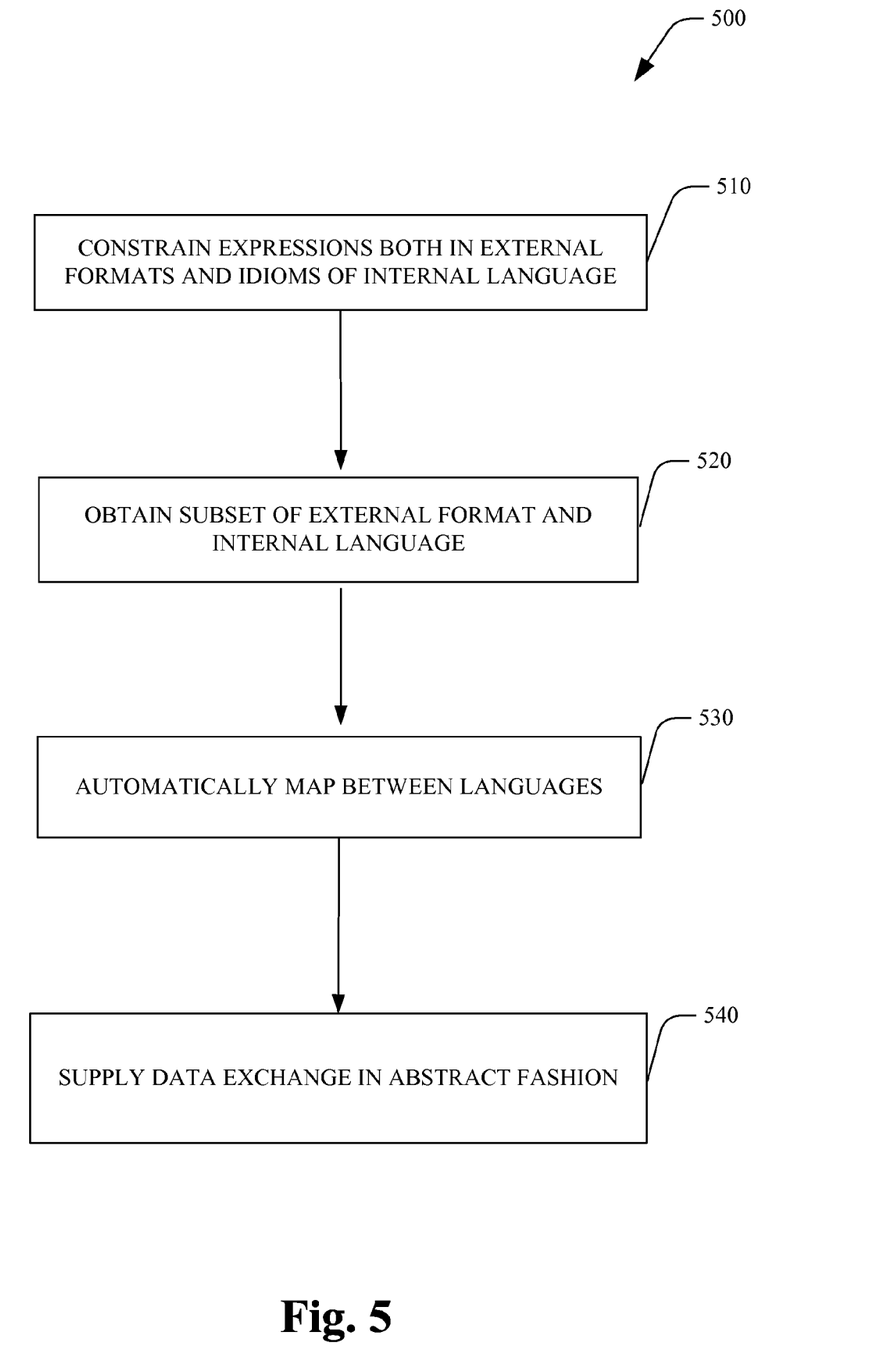
FIG. 5 illustrates a related methodology of automatically mapping between languages of applications, according to a particular aspect of the subject innovation.

FIG. 5 illustrates a related methodology 500 for automatically mapping between languages of applications to supply an abstract data exchange therebetween. Initially, and at 510 expressions can be constrained, both in the external formats and the idioms of the internal language (which are used for describing it) to arrive at a subset of the two, at 520. Next, by employing terms that are internal to the program, the external expressions can be expressed and mapped automatically at 530. Such enables data exchange in an abstract fashion at 540—without requiring type equivalence between sender and receiver—wherein mapping of data type can become part of the program itself. Accordingly, external formatting can be defined as part of the programming language and automating transformation can be provided on a sending side and a receiving side of data exchange.

The mapping can occur by constraining expressions both in the external formats and the idioms of the internal language that are used to describing it, to arrive at a subset of the two. Such subset enables sharing between languages of different object oriented type systems, and allows mapping to be straight forward and readily preformed. For example, by employing terms that are internal to the program, the external expressions can be expressed and mapped automatically. Accordingly, preserving versionability of the exchange format can be readily provided.

Figure 6:
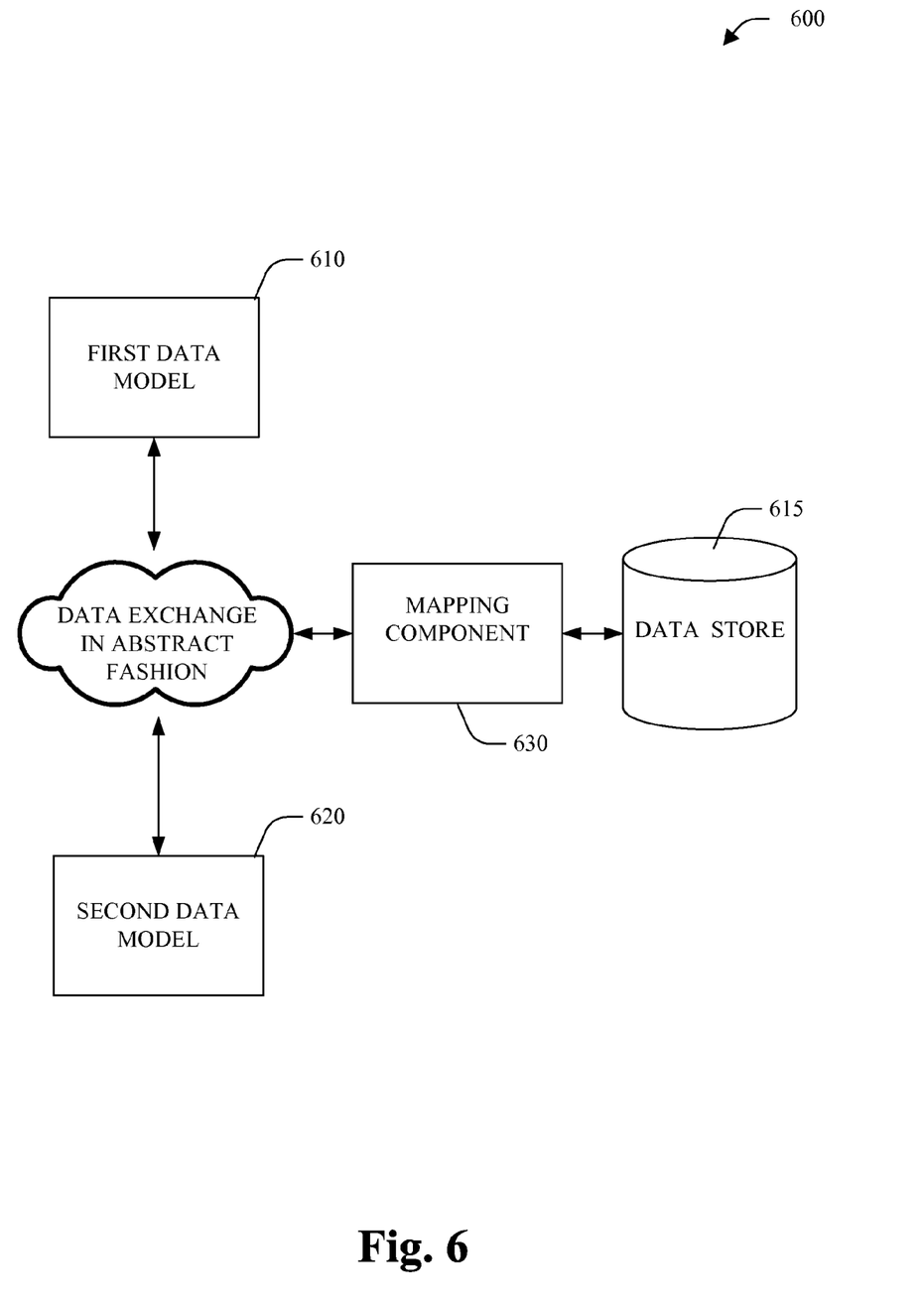
FIG. 6 illustrates a data interaction system that enables data exchange in an abstract manner between applications, in accordance with an aspect of the subject innovation.

FIG. 6 illustrates a data interaction system 600 that enables data exchange in an abstract manner between a first model 610 and a second model 620. In general, the first data model 610 and the second data model 620 can include object oriented models, wherein, objects can be packages of data and functionality within single units or items, and can be associated with identities that are separate from identities of other objects, (although objects can relate to each other via messages.) For example, messages can be instructions that are received or delivered by object(s) based upon an object's (or other object's) data and/or functionality (e.g., methods). In addition, data within objects can include numbers, literal strings, variables, references, and other suitable data. Such data can relate to properties of the objects, as class definitions and object-dependency indicia.

Structure and behavior of objects are defined by a class, which is a definition of all objects of a specified type. Objects are explicitly created as a function of a class, and an object so created is considered to be an instance of such class. Objects can further be associated with method pointers, member access control, implicit data members utilized to locate instances of a class in a class hierarchy, and the like. Moreover, an object's data and/or functionality can be based on data and/or functionality of disparate objects(s), from which the former object inherits. Inheritance enables commonalities amongst differing types of objects to be expressed a single time and thereafter utilized multiple times in multiple contexts.

The mapping can occur via the mapping component 630 by constraining expressions both in the external formats and the idioms of the internal language that are used to describing it, to arrive at a subset of the two. Such subset enables sharing between languages of different object oriented types/data models 610, 620, and allows mapping to be straight forward and readily preformed. For example, by employing terms that are internal to the program, the external expressions can be expressed and mapped automatically. Accordingly, preserving versionability of the exchange format can be readily provided.

The system 600 further includes a data store 615 that stores information regarding each direct or inherited attribute of each type of a type hierarchy. The mapping component 610 can store information in the inheritance mapping data store based, at least in part, on information received from a user regarding a quantity of relations used for representing the type hierarchy, as discussed above with respect to the mapping component 630.

Figure 7:
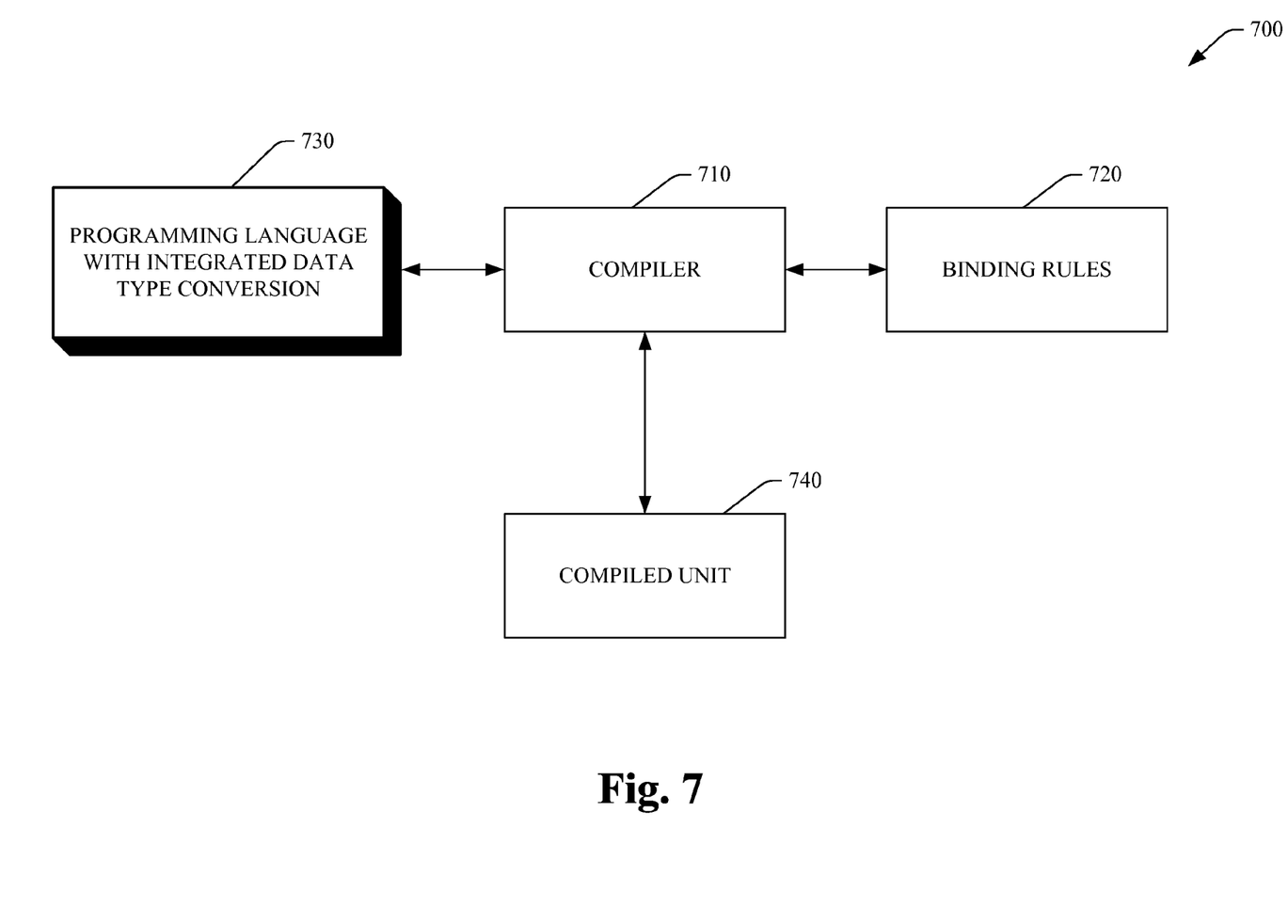
FIG. 7 illustrates a system block diagram of a compiler that interacts with a programming language in accordance with an aspect of the subject innovation.

FIG. 7 illustrates a system block diagram of a compiler 710 that interacts with a programming language with integrated data type conversions 730, in accordance with an aspect of the subject innovation. As explained earlier, the invariants language can be defined as a functional subset of the source language that allows the programmer to express the rules using predicate logic, defining predicates and clauses over the data elements of the schema and the schemata it refers to. Accordingly, by expressing rules in form of predicate logic (instead of imperative program logic) the subject innovation increase a likelihood that compiler 710 can reason about the data. The compilation system 700 includes a compiler 710 that performs compilation tasks such as syntax checking, binding, and code optimization, among others. To perform some of these tasks, the compiler 710 can access a set of binding rules 720. The binding rules 720 can specify order of bindings and a binding hierarchy, among other things. A compiled unit 740 is the output of the compiler 710. The compiler 710 can further employs the binding rule 720 to create the compiled unit 740.

Similarly, for each schema class the compiler 710 can supply methods to perform transformation, e.g. with the following definition:

```
Public Shared Function _Transform(Of T) (ByVal src As
SchemaInterface) As T
    Return CType(Transform(src, GetType(T)), T)
End Function
Public Shared Function Transform(ByVal src As SchemaInterface,
        ByVal targetType As Type) As Object
    If src Is Nothing Then Return Nothing
    If TypeOf src Is ScHasName Then
        Dim impl As ScHasName = CType(src, ScHasName)
        If impl._wrapped IsNot Nothing Then
            If CObj(impl._wrapped).GetType Is targetType Then
                Return impl._wrapped
            End If
        End If
    End If
    With _Wrap(SchemaImplementationBase.GetTransformTarget(
                src,
                GetType(SchemaInterface),
                targetType)
        .Name = src.Name
        .Addr = src.Addr
    End With
End Function
```

In general, when performing a transformation, the compiler 710 can face three scenarios. The first scenario occurs when the target type implements a schema that is the static type of the source expression. In such case, the target type's Transform method can be employed for the transformation. In the second scenario, the target type typically does not implement the dynamic interface that is the static type of the source. In such case, the source schema's Transform method can be employed for the transformation. In the third scenario, the source type can include an array of a schema type (e.g. multi-dimensional), or a generic binding wherein the type parameter is a schema type. The compiler 710 can subsequently employ the 'Transform' method found in Runtime-Schema to perform the transformation, for example.

Figure 8:
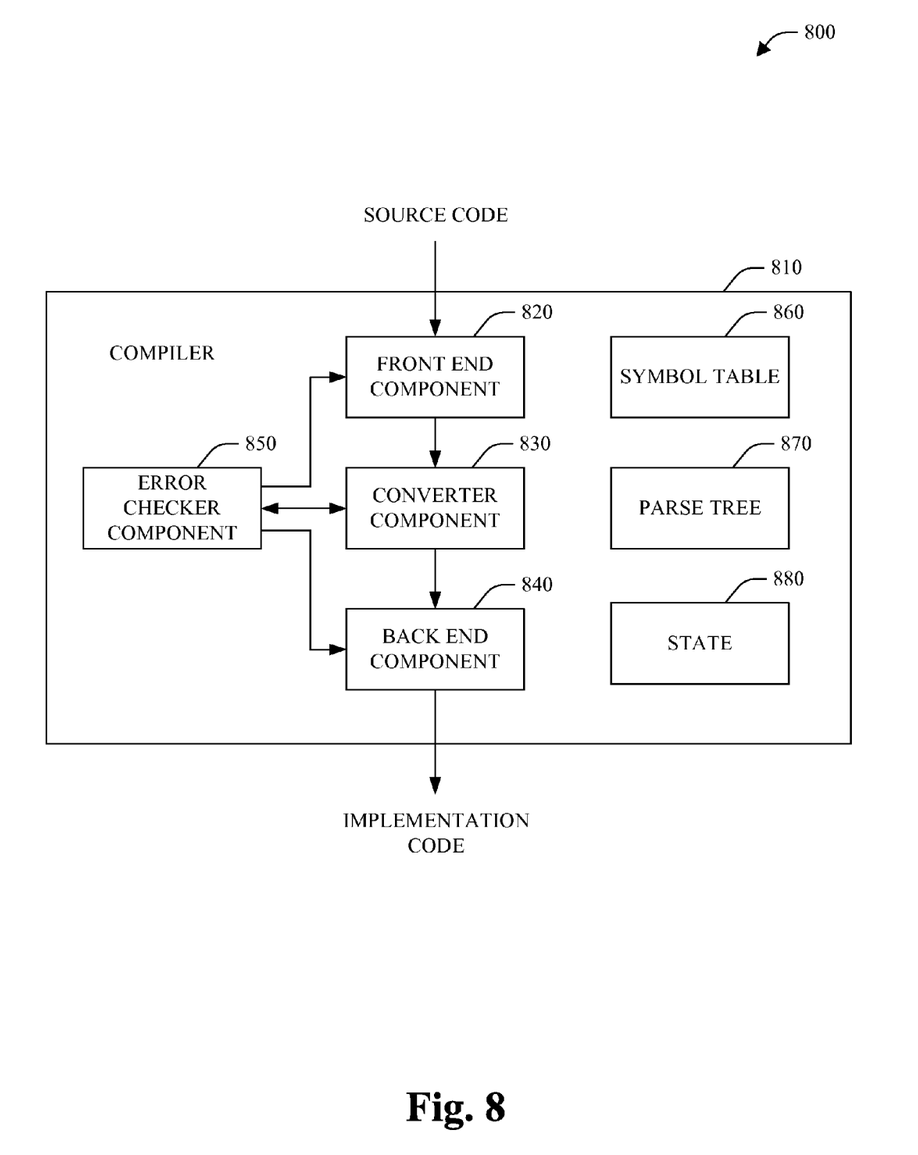
FIG. 8 illustrates a particular compiler system that can interact with a programming language in accordance with an aspect of the subject innovation.

FIG. 8 is a block diagram depicting a compiler environment 800 that can be employed in conjunction with various aspects of the subject innovation. In particular, compiler environment 800 can produce implementation code (e.g., executable, intermediate language . . . ). The compiler environment 800 includes a compiler 810 including front-end component 820, converter component 830, back-end component 840, error checker component 850, symbol table 860, parse tree 870, and state 880. The compiler 810 accepts source code as input and can generate implementation code as output (e.g. intermediate language code, executable . . . ). The input can include but is not limited to source code comprising programmatic elements and/or expressions in one or more programming languages as described herein. The relationships amongst the components and modules of the compiler environment illustrate the main flow of data. Other components and relationships are not illustrated for the sake of clarity and simplicity. Depending on implementation, components can be added, omitted, split into multiple modules, combined with other modules, and/or other configurations of modules.

Compiler 810 can accept as input a file having source code associated with processing of a sequence of elements. The source code may include mixed-language code including associated with a number of type systems. Compiler 810 may process source code in conjunction with one or more components for analyzing constructs and generating or injecting code.

A front-end component 820 reads and performs lexical analysis upon the source code. In essence, the front-end component 820 reads and translates a sequence of characters (e.g., alphanumeric) in the source code into syntactic elements or tokens, indicating constants, identifiers, operator symbols, keywords, and punctuation among other things. Converter component 830 parses the tokens into an intermediate representation. For instance, the converter component 830 can check syntax and group tokens into expressions or other syntactic structures, which in turn coalesce into statement trees. Conceptually, these trees form a parse tree 870. Furthermore and as appropriate, the converter module 830 can place entries into a symbol table 1160 that lists symbol names and type information used in the source code along with related characteristics.

A state 880 can be employed to track the progress of the compiler 810 in processing the received or retrieved source code and forming the parse tree 870. For example, different state values indicate that the compiler 810 is at the start of a class definition or functions, has just declared a class member, or has completed an expression. As the compiler progresses, it continually updates the state 880. The compiler 810 may partially or fully expose the state 880 to an outside entity, which could subsequently provide input to the compiler 810.

Based upon constructs or other signals in the source code (or if the opportunity is otherwise recognized), the converter component 830 can inject code to facilitate efficient and proper execution. Rules coded into the converter component 830 or other component indicates what must be done to implement the desired functionality and identify locations where the code is to be injected or where other operations are to be carried out. Injected code typically includes added statements, metadata, or other elements at one or more locations, but this term can also include changing, deleting, or otherwise modifying existing source code. Injected code can be stored as one or more templates or in some other form. In addition, it should be appreciated that symbol table manipulations and parse tree transformations can take place.

Likewise, based on the symbol table 860 and the parse tree 870, a back-end component 840 can translate the intermediate representation into output code. The back-end component 840 converts the intermediate representation into instructions executable in or by a target processor, into memory allocations for variables, and so forth. The output code can be executable by a real processor, but the invention also contemplates output code that is executable by a virtual processor.

Furthermore, the front-end component 820 and the back end component 840 can perform additional functions, such as code optimization, and can perform the described operations as a single phase or in multiple phases. Various other aspects of the components of compiler 810 are conventional in nature and can be substituted with components performing equivalent functions. Additionally, at various stages of processing of the source code, an error checker component 850 can check for errors such as errors in lexical structure, syntax errors, and even semantic errors (e.g., type checking). Upon detection error, checker component can halt compilation and generate a message indicative of the error. Furthermore and as previously described, the compiler 810 can associate one or more types from a multitude of type systems with programmatic elements to facilitate not only type checking but also intelligent program support.

As used in herein, the terms "component," "system" and the like are intended to refer to a computer-related entity, either hardware, a combination of hardware and software, software or software in execution. For example, a component may be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation may be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
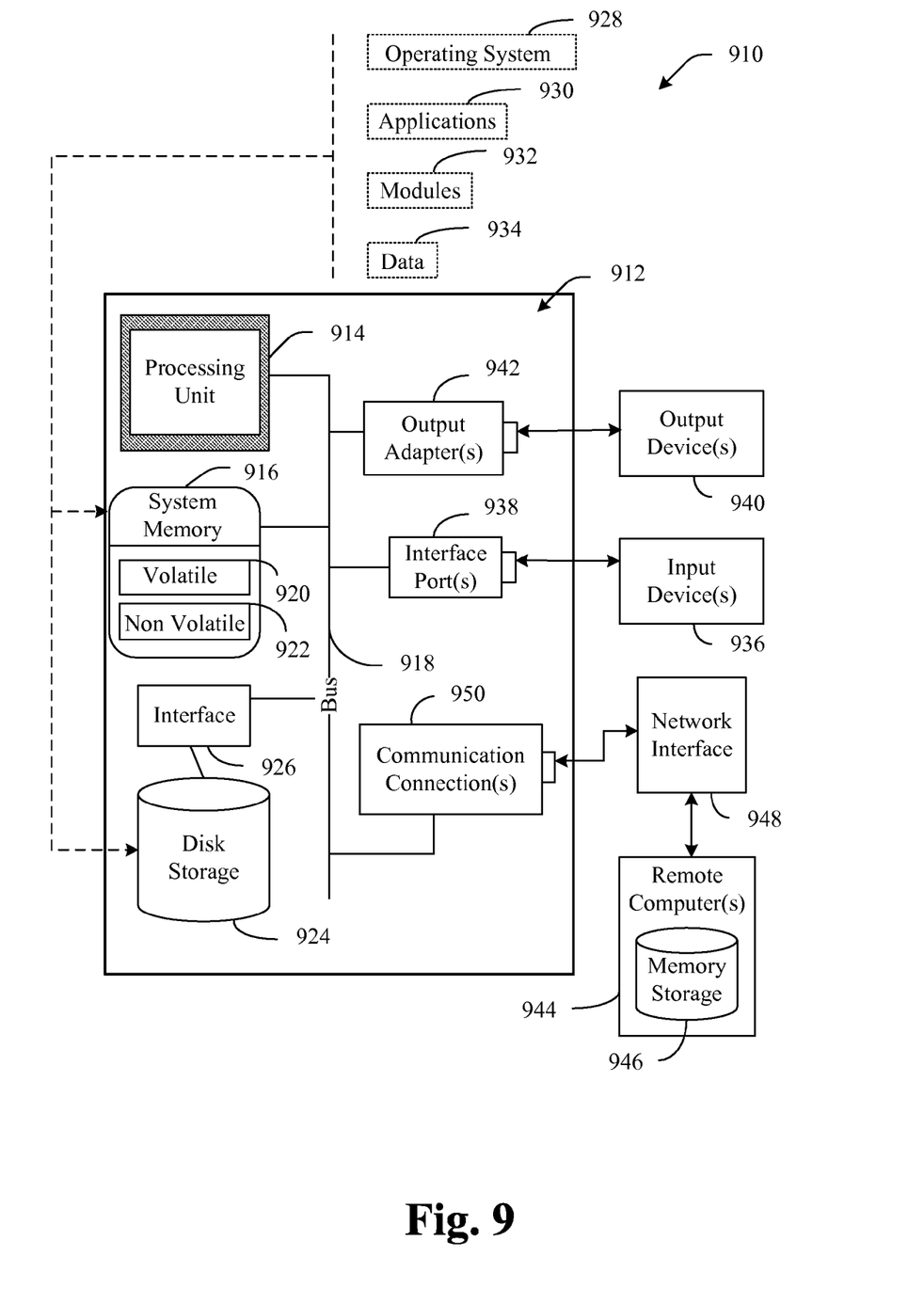
FIG. 9 illustrates an exemplary operating environment for implementing various aspects of the subject innovation.
Figure 10:
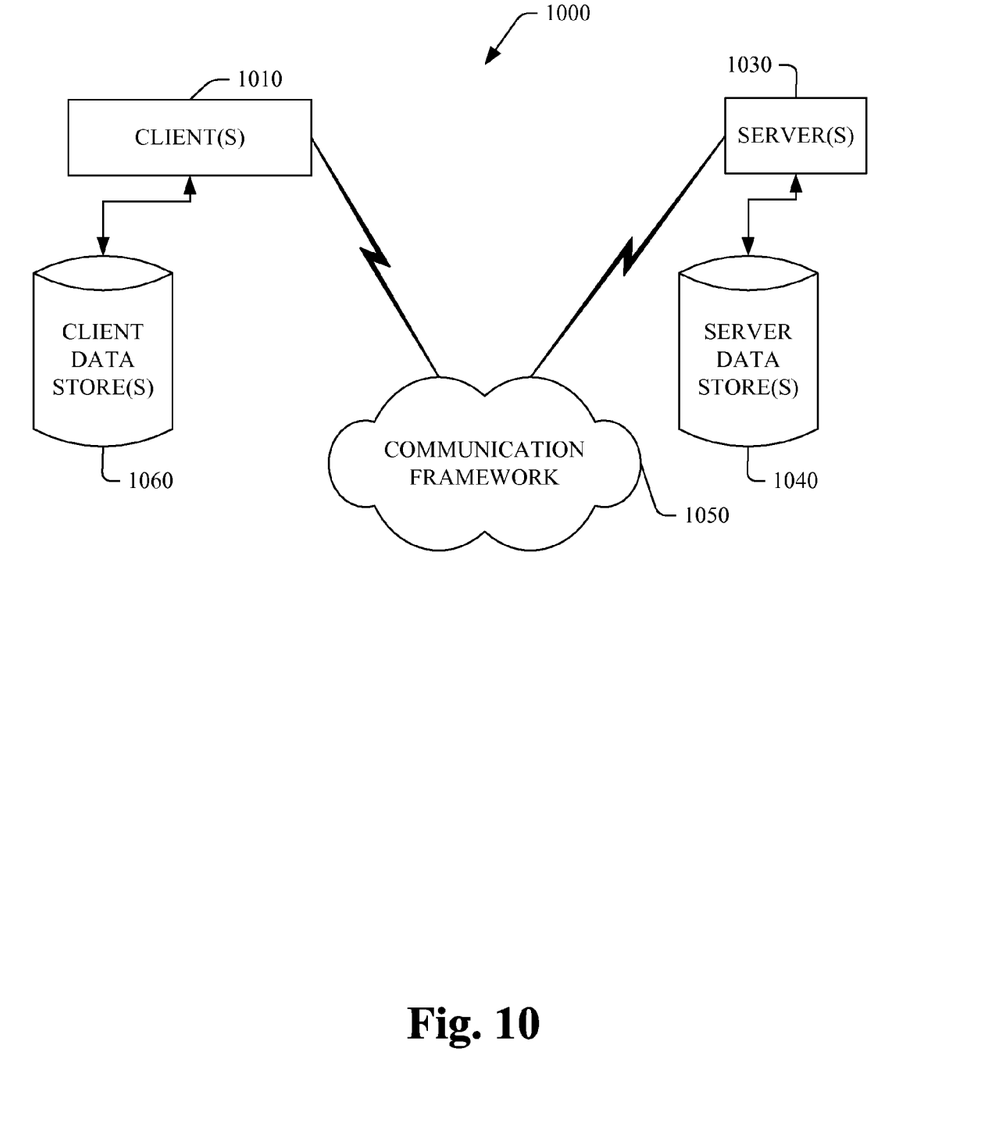
FIG. 10 is a schematic block diagram of a sample-computing environment with which the subject innovation can interact.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 9, an exemplary environment 910 for implementing various aspects of the subject innovation includes a computer 912 (e.g., desktop, laptop, server, hand held, programmable consumer or industrial electronics . . . ). The computer 912 includes a processing unit 914, a system memory 916, and a system bus 918. The system bus 918 couples system components including, but not limited to, the system memory 916 to the processing unit 914. The processing unit 914 can be any of various available microprocessors. Dual microprocessors and other multiprocessor architectures (e.g. multi-core) also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory.

Computer 912 also includes removable/non-removable, volatile/non-volatile computer storage media. FIG. 9 illustrates, for example, mass or auxiliary storage 924. Mass storage 924 includes, but is not limited to, devices like a magnetic disk drive, floppy disk drive, tape drive, Jaz drive, Zip drive, LS-100 drive, flash memory card, or memory stick. In addition, mass storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the mass storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on mass storage 924 and loaded to system memory 916, acts to control and allocate resources of the system 912. System applications 930 take advantage of the management of resources by operating system 928 through program modules 932 and program data 934 stored either in system memory 916 or on mass storage 924. It is to be appreciated that the subject innovation can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912 and to output information from computer 912 to an output device 940. Output adapter 942 is provided to illustrate that there are some output devices 940 like displays (e.g., flat panel, CRT, LCD, plasma . . . ), speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected (e.g., wired or wirelessly) via communication connection 950. Network interface 948 encompasses communication networks such as local-area networks (LAN) and wide-area networks (WAN).

Communication connection(s) 950 refers to the hardware/software employed to connect the network interface 948 to the bus 918. While communication connection 950 is shown for illustrative clarity inside computer 916, it can also be external to computer 912. The hardware/software necessary for connection to the network interface 948 includes, for exemplary purposes only, internal and external technologies such as, modems including regular telephone grade modems, cable modems, power modems and DSL modems, ISDN adapters, and Ethernet cards or components.

FIG. 10 is a schematic block diagram of a sample-computing environment 1000 with which the subject innovation can interact. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing the subject innovation, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030. For example, the virtual reality component can be associated with server(s) 1030. This web service server can also be communicatively coupled with a plurality of other servers 1030, as well as associated data stores 1040, such that it can function as a proxy for the client 1010.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A method, implemented within a computing system that includes at least one processor, for integrating data type conversion into a programming language by using abstract data type schemas, implemented with a subset of the programming language, to map from an internal data type to an external data format, the method comprising:
   a computing system, which includes at least one processor, identifying internally-formatted data that is formatted in accordance with a first internal data type described by a first programming language of a first application;
   the computing system identifying a data model schema that defines an external data format described by a functional subset of the first programming language, and that defines a declarative mapping between the first internal data type and the external data format using the functional subset of the first programming language, the data model schema including:
      one or more data fields; and
      one or more value-based rules that define enforceable semantic rules about data exchanged in the one or more data fields and that provide automated argument validation when the data model schema is utilized;
   the computing system converting the internally-formatted data into externally-formatted data that is formatted in accordance with the external data format using the data model schema, wherein converting comprises:
      mapping the internally-formatted data to the one or more data fields; and
      automatically validating that the one or more data fields contain valid data by enforcing the one or more value-based rules on the one or more data fields; and
   the computing system exchanging the externally-formatted data with a second application that uses a second internal data type.

2. The method of claim 1, wherein the one or more value-based rules comprise invariants to the external data format that do not modify data.

3. The method of claim 1, wherein each of the one or more data fields is associated with one or more of a name, a type or acceptable values of said data field.

4. The method of claim 1, wherein the internally-formatted data comprises an instance of an object class that includes both data and operations on the data, and wherein the external data comprises data only.

5. The method of claim 1, wherein the second internal data type is described by a second programming language of the second application.

6. The method of claim 1, wherein the one or more value-based rules use predicate logic to define predicates and clauses over the one or more data fields, thereby enabling reasoning about the one or more data fields.

7. The method of claim 1, further comprising:
   identifying a mapping of structure, fields and relationships between the first internal data type and the external data format; and
   wherein mapping the internally-formatted data to the one or more data fields includes using the mapping.

8. The method of claim 7, wherein mapping comprises constraining expressions both in the external data format and in idioms of the first programming language to arrive at a subset of the two.

9. The method of claim 1, wherein automatically validating that the one or more data fields contain valid data occurs when data passes a trust boundary.

10. The method of claim 1, wherein the data model schema further includes one or more of:
    at least one function that defines sub-expressions of invariant definitions;
    at least one constant declaration; or
    at least one enum declaration.

11. The method of claim 1, wherein the data model schema inherits from another data model schema.

12. The method of claim 1, wherein the data model schema validly converts a plurality of versions of the first internal data type to the external data format.

13. The method of claim 1, wherein converting the internally-formatted data into externally-formatted data comprises coercing a class instance to a schema instance.

14. The method of claim 1, wherein the external data format is adapted to exchange data between the first data type and the second data type.

15. The method of claim 14, wherein the first data type is different from the second data type.

16. A computer system comprising:

at least one processor; and one or more computer storage devices having stored thereon computer executable instructions which, when executed by the at least one processor, implement a method comprising:

the computing system identifying internally-formatted data that is formatted in accordance with a first internal data type described by a first programming language of a first application;

the computing system identifying a data model schema that defines an external data format described by a functional subset of the first programming language, and that defines a declarative mapping between the first internal data type and the external data format using the functional subset of the first programming language, the data model schema including:

one or more data fields; and one or more value-based rules that define enforceable semantic rules about data exchanged in the one or more data fields and that provide automated argument validation when the data model schema is utilized;

the computing system converting the internally-formatted data into externally-formatted data that is formatted in accordance with the external data format using the data model schema, wherein converting comprises:

mapping the internally-formatted data to the one or more data fields; and automatically validating that the one or more data fields contain valid data by enforcing the one or more value-based rules on the one or more data fields; and the computing system exchanging the externally-formatted data with a second application that uses a second internal data type.

17. One or more computer storage devices having stored thereon computer executable instructions which, when executed by at least one processor of a computing system, implement a method for integrating data type conversion into a programming language by using abstract data type schemas, implemented with a subset of the programming language, to map from an internal data type to an external data format, the method comprising:

a computing system, which includes at least one processor, identifying internally-formatted data that is formatted in accordance with a first internal data type described by a first programming language of a first application;

the computing system identifying a data model schema that defines an external data format described by a functional subset of the first programming language, and that defines a declarative mapping between the first internal data type and the external data format using the functional subset of the first programming language, the data model schema including:

one or more data fields; and one or more value-based rules that define enforceable semantic rules about data exchanged in the one or more data fields and that provide automated argument validation when the data model schema is utilized;

the computing system converting the internally-formatted data into externally-formatted data that is formatted in accordance with the external data format using the data model schema, wherein converting comprises:

mapping the internally-formatted data to the one or more data fields; and automatically validating that the one or more data fields contain valid data by enforcing the one or more value-based rules on the one or more data fields; and the computing system exchanging the externally-formatted data with a second application that uses a second internal data type.

* * * * *